United States Patent [19]
Sasaki et al.

[11] Patent Number: 5,089,905
[45] Date of Patent: Feb. 18, 1992

[54] COLOR LIQUID CRYSTAL DISPLAY SYSTEM WITH SPACER-ADHESIVE AND SEPARATE RIGID SPACERS ACROSS DISPLAY SURFACE

[75] Inventors: Jun Sasaki; Akira Ogawa; Yasumasa Akimoto; Takao Minato; Hajime Ohnishi, all of Tokyo, Japan

[73] Assignee: Toppan Printing Co., Ltd., Japan

[21] Appl. No.: 246,318

[22] Filed: Sep. 19, 1988

[30] Foreign Application Priority Data

Sep. 22, 1987 [JP] Japan ............................ 62-138489
Mar. 10, 1988 [JP] Japan ............................ 63-57298

[51] Int. Cl.⁵ ........................................... G02F 1/133
[52] U.S. Cl. .............................. 359/64; 359/81; 359/93
[58] Field of Search ............ 350/339 R, 337, 343, 350/344, 350 S

[56] References Cited

U.S. PATENT DOCUMENTS

| | | | |
|---|---|---|---|
| 4,328,493 | 5/1982 | Shanks et al. | 350/346 |
| 4,586,791 | 5/1986 | Isogai et al. | 350/341 |
| 4,611,889 | 9/1986 | Buzak | 350/337 |
| 4,685,770 | 8/1987 | Baeger | 350/344 |
| 4,740,060 | 4/1988 | Komura et al. | 350/344 |
| 4,763,995 | 8/1988 | Katagiri et al. | 350/344 |
| 4,973,138 | 11/1990 | Yamazaki et al. | 350/344 |
| 4,983,023 | 1/1991 | Nakagawa et al. | 350/344 |
| 4,989,955 | 2/1991 | Ito et al. | 350/344 |

FOREIGN PATENT DOCUMENTS

| | | | |
|---|---|---|---|
| 0258848 | 3/1988 | European Pat. Off. | 350/344 |
| 0074222 | 6/1981 | Japan | 350/337 |
| 0017923 | 1/1982 | Japan | 350/343 |
| 0029031 | 2/1982 | Japan | 350/344 |
| 0095323 | 6/1983 | Japan | 350/344 |
| 0096925 | 5/1987 | Japan | 350/343 |
| 0240932 | 10/1987 | Japan | 350/343 |

*Primary Examiner*—Stanley D. Miller
*Assistant Examiner*—Anita Pellman Gross
*Attorney, Agent, or Firm*—Lerner, David, Littenberg, Krumholz & Mentlik

[57] ABSTRACT

The present invention provides a color display system characterized in that polarized surface control means comprises a ferro-electric liquid crystal cell, and a spacer and adhesive layer is interposed between a first panel and a second panel, the spacer and adhesive layer substantially setting a gap d between the first and second panels holding the ferroelectric liquid crystal therebetween to electrically drive the same to:

$$d = \frac{\lambda}{2 \cdot \Delta n}$$

wherein:
λ: specific wavelength
Δn: refractive index anisotropy
d: gap (thickness of a liquid crystal layer).

8 Claims, 8 Drawing Sheets

COLOR LIQUID CRYSTAL DISPLAY SYSTEM WITH SPACER-ADHESIVE AND SEPARATE RIGID SPACERS ACROSS DISPLAY SURFACE

BACKGROUND OF THE INVENTION (1) Field of the Invention

The present invention relates to color display systems, and in particular, a color display system which uses a ferroelectric liquid crystal as a polarizing surface control plate capable of effecting high speed switching.

(2) Description of Prior Art

A field sequential color display system, as color display means for a color television, has been proposed by C.B.S. Ltd., U.S.A., and the like in the 1950s. In those days, however, the color selection apparatus was of a mechanical system, and the technical resolution has not been obtained in terms of the larger type and high speed display, failing to hold the main current of the color television system. However, recently, a field sequential color display system has been reconsidered by some of fields with the development of a liquid crystal optical switch, which system is proposed in a colored display (U.S. Pat. No. 4,003,081 Specification) of a radar display which utilizes a combination of a twisted nematic type (hereinafter merely referred to a TN) liquid crystal and a colored polarizing plate.

Even so, the TN liquid crystal is slow in response time and therefore is somewhat difficult to be employed for a field sequential color television. It has been desired to use an optical shutter capable of being synchronized with higher speed frame frequencies. As such optical sutters, i. A two frequency drive liquid crystal cell which utilizes a liquid crystal of which dielectric anisotropy is changed by a drive signal frequency is disclosed in "Fast-Switching Twisted Nematic Electro-Optical Shutter and Color Filter" (Apr. 4, 1974) written by Reins and Shanks, Electronics Letters, Vol. 10, No. P114-115 (USA). In this liquid crystal, the dielectric constant anisotropy (hereinafter abbreviated to $\Delta\epsilon$) under the electric field of low frequency signal is positive, whereas the $\Delta\epsilon$ under the electric field of the high frequency signal is negative. By the combination of two drive signals of high and low frequencies, the behavior of liquid crystal molecules varies, when a high frequency signal is applied and when a low frequency signal is applied, to provide ON and OFF at high speeds.

ii. The $\pi$ cell which utilizes an arrangement of directors wherein a reverse torque is not generated (not twisted) in an intermediate director of a liquid crystal cell by a bias signal and an adjustment of a direction of rubbing an oriented film and provides ON and OFF at high speeds caused by birefringence effect is published by Boss et al (U.S. Pat. No. 4,582,396

However, the two frequency drive liquid crystal cell of (i) requires a complicated drive circuit which can supply a high frequency signal pulses of high voltage to a capacitative load produced by a liquid crystal cell. In addition, it is difficult to obtain a uniform display over a large area. The $\pi$ cell of (ii) is faster in response of liquid crystal than an ordinary TN cell but a fall time is long, 2 msec, which corresponds to ten times of a rise time. When the frame frequency becomes fast, a time of an intermediate state between the rise and fall occupied during a period becomes relatively long. For this reason, color contrast and brightness lower. Moreover, since a voltage is always applied to a cell, a liquid crystal molecule has a large tilt angle even during OFF with the result that dependency on the angle of view strongly appears, and only the narrow range of color display may be observed. Because of the problems noted above, a practical field sequential full color display has been difficult to be realized.

OBJECT OF THE INVENTION

It is an object of the present invention to provide a field sequential color display system with high resolution and high speed response which is simple in drive system and which can obtain excellent color contrast and wide angle of field.

SUMMARY OF THE INVENTION

The present invention provides a color display system comprising means for color-polarizing an optical image with a plurality of color components in two directions with respect to a specific wavelength, polarized surface control means for rotating a polarized surface of light thus color-polarized at a suitable timing, and polarizing means for passing one polarized light among lights having passed through said polarized surface control means, characterized in that said polarized surface control means comprises a ferro-electric liquid crystal cell.

BRIEF DESCRIPTION OF THE DRAWINGS

FIG. 2 (a) is an explanatory view showing one embodiment of a color display system according to the present invention, and FIGS. 2 (b) and (c) are respectively explanatory views showing a colored display state thereof;

FIG. 3 (a) being a sectional view, FIG. 3(b) a plan view, FIG. 3(c) an enlarged plan view of essential parts, FIG. 3(d) a sectional view of essential parts showing another embodiment;

DETAILED DESCRIPTION OF THE INVENTION

Figure 1:
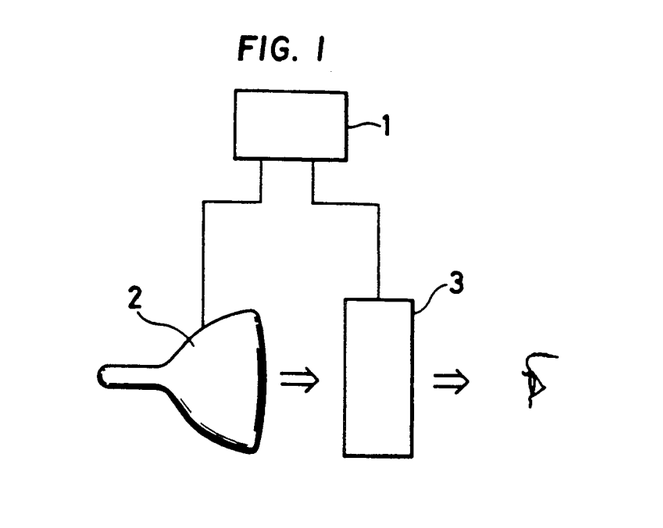
FIG. 1 is a block diagram showing a basic structure of a color display system according to the present invention.

A color display system according to the present invention is basically composed of three sections, i.e., an image display signal section 1, an image display section 2 and a color selection section 3. The image display signal section 1 emits two signals, i.e., a color selection synchronous signal and an image signal having a color component in synchronism with a color thereof. (See FIG. 1.)

The image display section 2 comprises a light source which displays an image according to the aforesaid image signal, for example, such as a CRT, a fluorescent display tube, and the like.

The color selection section 3 has a function to change colors of a color filter according to the aforesaid color selection signal as shown in FIG. 2, for example, and is composed of two-tone polarizers 10 and 11, a variable polarized surface control plate 12 made while holding a ferro-electric liquid crystal and a neutral color polarizing plate 13, which are disposed in said order.

Figure 3:
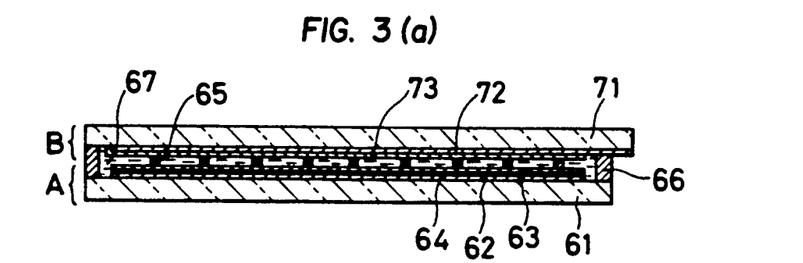
FIG. 3 is a view showing one example of a liquid crystal cell used for a control plate of a color display system according to the present invention.
Figure 4A:
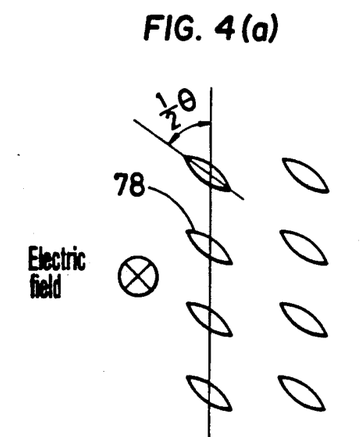
FIGS. 4(a) and (b) are respectively schematic plan views showing the orientation direction of a ferro-electric liquid crystal with respect to an electric field.
Figure 4B:
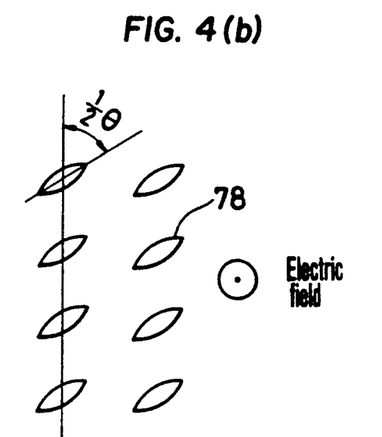

The variable polarized surface control plate 12 comprises a cell having a ferro-electric liquid crystal 67 incorporated therein as shown in FIG. 3(a) so that a voltage is applied between transparent electrodes 72 and 62 of the cell to reverse (in positive and negative) the voltage applying direction whereby as shown in FIG. 4, a liquid crystal element 78 assumes the arrangement of the state (a) or state (b). The liquid crystal element 78 is different in refractive index in a long axis direction and a short axis direction, showing a birefringence. Thereby, a thickness of a liquid crystal layer 4 of the cell is optimized whereby the ferro-electric liquid crystal sealed cell is formed into a polarized surface control plate. A liquid crystal wherein a long axis direction of a liquid crystal element is varied by approximately 45° according to the direction of polarity of an electric field application is used to prepare a cell which constitutes the polarized surface control plate. With this, this liquid crystal cell forms a variable polarized surface control plate with 0 and 90°.

Figure 3C:
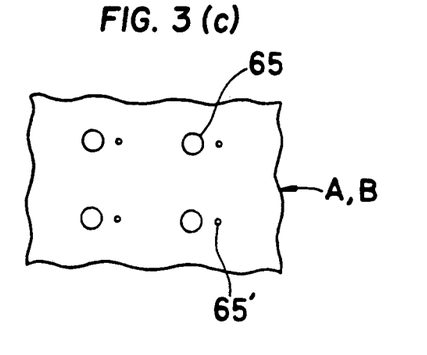

The variable polarized surface control plate 12 made while holding a ferro-electric liquid crystal has a liquid crystal layer 67 comprising a ferro-electric chiral smectic liquid crystal representative of a chiral smectic C phase or a chiral smectic H phase as shown in FIG. 3(a), the liquid crystal layer 67 having a thickness in the range of 0.5 to 3.0μ wherein a long axis of a liquid crystal element is oriented parallel to a substrate surface, and two substrates 61 and 71 formed with orientation control films 63 and 73 on the transparent electrodes 62 and 72 are held through a spacer 65. An insulated film 64 may be formed as needed between the transparent electrodes 62 and 72 and orientation control films 63 and 73 of the substrates 61 and 71. The spacer 65 may comprise an adhesive layer comprising a photosensitive resin provided approximately evenly and in a fine pattern manner on the whole surface of a liquid crystal cell display surface to connect a first panel A and a second panel B. A seal section 66 can be formed in a manner similar to the spacer and adhesive layer 65. In the vicinity of the spacer and adhesive layer 65 may be provided a rigid auxiliary spacer 65' having the same thickness as that of the adhesive layer 65 as shown in FIG. 3(c) as needed. For the transparent substrates 61 and 62, a glass substrate having a thickness of 1 mm to 5 mm can be used. An optically polished non-alkali metal glass is preferred but a plate glass coated with a silicon oxide may be used. The picture element electrode 62 and the opposed electrode 72 are formed by subjecting tin oxide, indium oxide or a mixture thereof (ITO) to spattering or vapor deposition or the like and then subjecting them to photoetching as a conventional method to form them into a suitable shape. The orientation films 63 and 73 are formed by coating and drying a polyvinyl alcohol, a polyamide and the like by a spin coating, offset printing or the like, and thereafter suitably pattering and rubbing as needed. For the orientation films 63 and 73, rhombic vapor deposition of $SiO_2$ may be also used. The insulated film 64 is subjected to spattering of $SiO_2$ or $Al_2O_3$ as needed so as to have a thickness of 0.2μ to 0.5μ. The insulated film 64 causes to enhance a pressure resistance and to enhance an orienting property of the ferro-electric liquid crystal 67.

The spacer and adhesive layer 65 is made of at least one kind of resin selected from casein, glue, gelatin, low molecular weight gelatin, novolak resin, rubber, polyvinyl alcohol, vinyl polymer, acrylate resin, polyacrylamide, bisphenol resin, polymide, polyester, polyurethane or polyamide, or made of a material in which at least one kind of resin selected therefrom is formed into a photosensive resin. The rubber herein termed preferably comprises isoprene cyclized rubber and butadiene cyclized rubber. As shown in FIG. 3(b), the spacer and adhesive layer 65 is evenly distributed over the whole surface of the display surface.

The spacer and adhesive layer 65 can be any form such as a dot, line, stripe, island, etc. as shown in FIG. 3(b), and the size thereof is desirable to be wide not to impair the display effect. The adhesive layer 65 can be applied with a black pigment or the like as needed so as to serve as a shading layer.

A thickness of a liquid crystal layer sandwiched between the first and second panels A and B is defined by the adhesive layer 65, and a thickness of the adhesive layer is adjusted by the conditions of coating and photolithographic steps of resins.

A thickness of the liquid crystal layer is less than 2 μm, and preferably is determined by the following calculation formula according to the back light used and the main wavelength of a color deflector plate.

$$d = \frac{\lambda}{2 \cdot \Delta n} \quad (1)$$

wherein d; the thickness of a liquid crystal layer, λ: the main wavelength, Δn: the refractive index anisotropy. The above formula was led from the relational expression which generally gives the brightness of light reaching the eyes when the cell is placed between cross nicols to pass the monochromatic light since the ferro-electric liquid crystal is displayed by the birefringence effect.

$$I_{out}^2 = I_{in}^2 \cdot \sin^2 2\theta \cdot \sin^2 \frac{\pi \Delta n \cdot d}{\lambda}$$

wherein $I_{out}$: the outgoing light, $I_{in}$: the incident light, θ: the angle formed between the long axes of liquid crystal molecules and the incident deflected light.

As a specific example, CRT of which a light emitting center spectrum using ZnO as a fluorescent body is 505 nm is used as a light source, a material of Δn=0.18 is used as a liquid crystal of cell, and blue and yellow are used for a color polarizer plate. In this case, 505 nm which is strongest in light emitting intensity is present in a blue central portion 12, a calculation is carried out with 505 nm as the main wavelength, then the desirable thickness of a liquid crystal layer is $d \simeq 1.4$.

A method for forming the spacer and adhesive layer 65 will be described in detail.

At least one kind of material selected from casein, glue, gelatin, novolak, rubber, polyvinyl alcohol, vinyl polymer, acrylate, acrylamide, bisphenol, polyimide, polyester, polyurethane, polyamide resin or those obtained by forming said resin into a photosensitive resin is coated, by a spinner, on the oriented film 63 of the first panel A or on the oriented film 73 of the second panel or on one or both of the insulated film 64 formed as needed and thereafter dried. If they have a photosensitive property, leave them alone. If they have no photosensitive property, a photoresist is coated thereon by a spinner and thereafter dried, after which it is subjected to suitable pattern exposure and then developed by a conventional photoetching method. If necessary, the material is subjected to wet or dry etching into a pattern. Unnecessary resist is removed and cleaned. Next, the first panel A is made to confront the second panel B, and the whole surface of the panels is evenly pressurized or the space sandwiched between the first panel A and the second panel B is reduced in pressure and at the same time heated to a softening temperature of those obtained by forming the resin used for the spacer and adhesive layer 65 or the aforesaid resin into a photosensitive resin, and retained for a fixed period of time, after which it is cooled to release the pressing state. In the above-described steps, the first panel A and the second panel B are joined together. As shown in FIG. 3(c), in the vicinity of the adhesive layer 65, the rigid auxiliary spacer 65' having a thickness equal thereto is formed from metal indium or chrome to thereby prevent the adhesive layer 65 from being collapsed and reduced in thickness when the first and second panels A and B are heated and pressed. Particularly, when the transparent substrate 62 and the transparent substrate 72 are poor in plane, a local pressure difference occurs within the whole panel even if it is evenly pressed and as the result, the adhesive layer 65 is liable to be collapsed in a portion in which pressure is concentrated, in which case the auxiliary spacer is extremely effective.

Figure 3D:
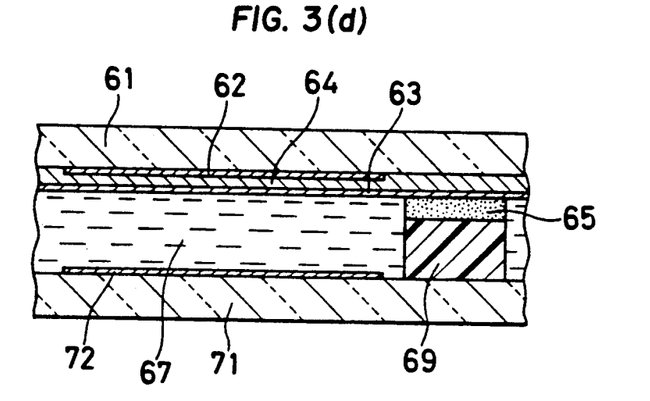

Further, as shown in FIG. 3(d), if the spacer and adhesive layer 65 is made into a multilayer construction more than two layers, those excellent in adhesiveness with glass, patterning property, adhesiveness when panels are bonded can be variously combined and prepared. Thereby, restriction when panels are fabricated can be relieved. For example, MP-1350 of novolak system photoresist (manufactured by Shipray Co., Ltd.) is excellent in adhesive property when panels are bonded but becomes extremely soft by heating at the time of adhesion, rendering maintenance of precision of a cell gap difficult. In view of this, polyamide or acrylic resin 69 is subjected to coating patterning to form the adhesive layer 65 of AZ 1350 to thereby provide a construction which is accurate in cell gap and high in reproducibilty. As described above, it is very effective in relieving restriction when panels are prepared, and in addition, it becomes for the first time to fabricate a practical panel by carrying out processing as described above.

The prominent difference of the present invention from prior art lies in the adhesive layer 65. In prior art, the spacer has no function to bond the first panel A and the second panel B, whereas the adhesive layer 65 according to the present invention has the function as the spacer and at the same time firmly bonds the first panel A' and the second panel B'. Furthermore, the adhesive layer 65 can be intentionally provided in a suitable place and in a suitable size, and therefore, the display effect is not impaired. For the adhesive layer 65, casein, glue, gelatin, low molecular weight gelatin, novolak resin, rubber, polyvinyl alcohol, vinylpolymer, acrylate resin, polyacrylamide, bisphenol resin, polyimide, polyester, polyurethane, polyamide resin or a photoresist thereof, etc. can be used, and they are heated and molten and then adhered to thereby obtain a rigid adhesive layer 65. Moreover, by the provision of the insulated film 64, electric insulating property between upper and lower electrodes can be increased to render practical drive possible.

The following effects may be obtained by the use of the spacer and adhesive layer 65:

(1) A liquid crystal layer can be set to a very thin thickness, such as 0.5 to 3.0 μm.

(2) An uniform thickness of a liquid crystal layer can be provided over the whole display surface of the liquid crystal cell, and accordingly, the polarization control can be equally carried out on the whole display surface and no unevenness occurs in color display.

(3) The liquid crystal cell is rigid in construction and high in durability.

Figure 2A:
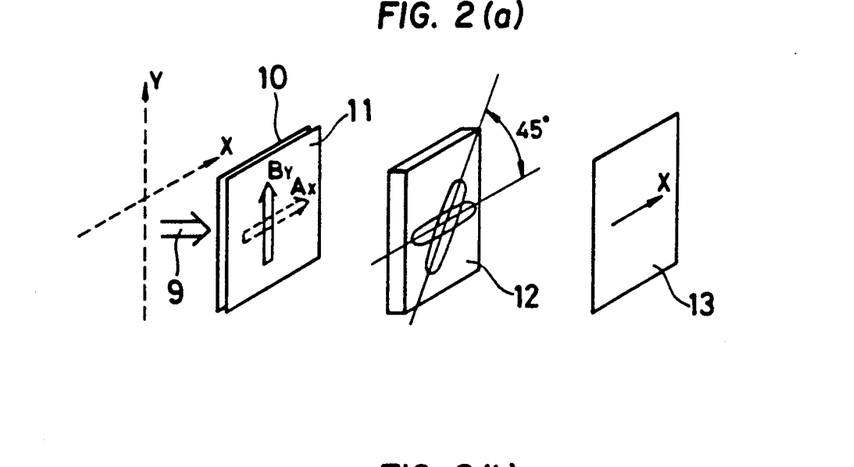
Figure 2B:
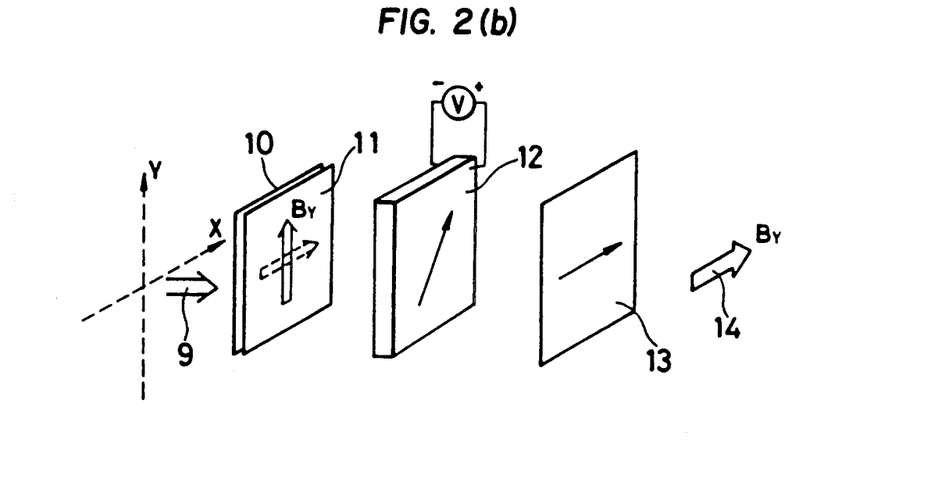
Figure 2C:
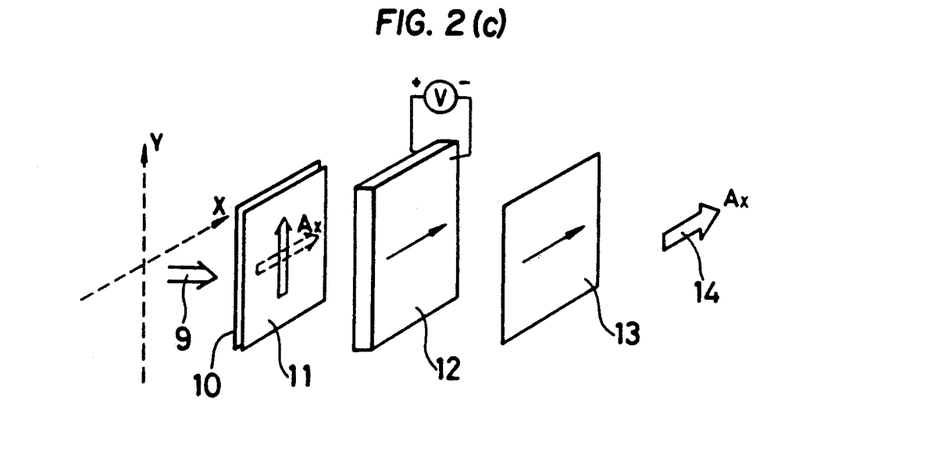

Next, a color displaying mechanism will be described. In FIG. 2(a), the incident light 9 from an image display section (not shown) is first polarized in two perpendicularly intersecting directions X and Y by two-tone polarizers 10 and 11 representative of two different color absorptions $A_X$ and $B_Y$ and is caused to pass through the variable polarized surface control plate 12. This variable polarized surface control plate 12 is arranged so that the direction of a long axis of a liquid crystal element coincides with one of the polarized surfaces of the previous two-tone polarizers. The light having passed through the variable polarized surface control plate is incident upon a third neutral color polarizing plate 13 without being affected by the birefringence. The neutral color polarizing plate 13 is arranged on the same polarized surface X as one of the two-tone polarizers 10 and 11. The colored polarized light $A_X$ in coincidence with the polarized surface of the neutral polarized plate 13 issues as the output light. (See FIG. 2(c).) When a voltage is applied to the variable polarized surface control plate to rotate the polarized surface of the incident light through 90°, the other colored polarized light $B_Y$ different from the former issues as the output from the neutral polarizing plate. (See FIG. 2(b)) When the voltage applied to the variable polarized surface control plate 12 is inverted in polarity, the polarized surface returns to its original state and the output light is $A_X$.

Figure 6A:
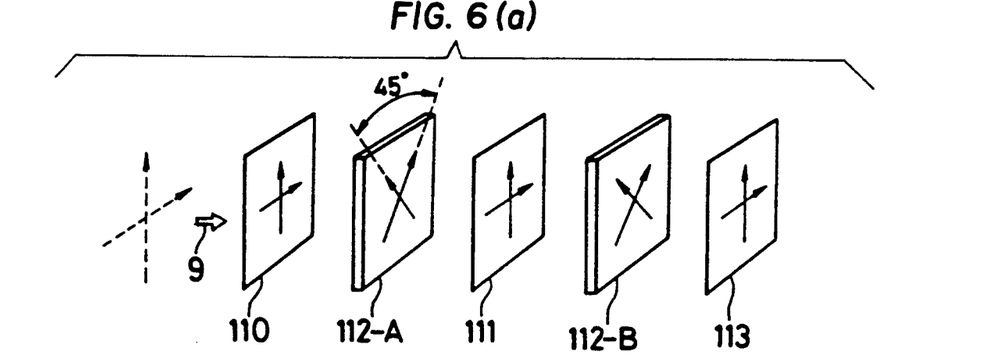
FIGS. 6(a), 6(b), and 6(c) are explanatory views showing the structure of a further embodiment of the present invention.

The present invention will be further described with reference to FIG. 6. In FIG. 6(a), the light 9 from the image display section (not shown) reaches a viewer passing through a first color polarizing plate 110, a first variable polarized surface control plate 112-A, a second color polarizing plate 111, a second variable polarized surface control plate 112-B, and a third color polarizing plate 113.

Figure 6B:
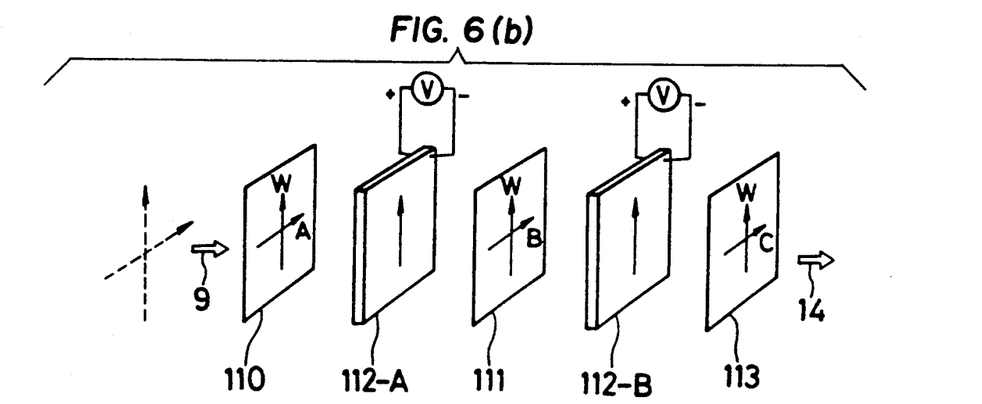
Figure 6C:
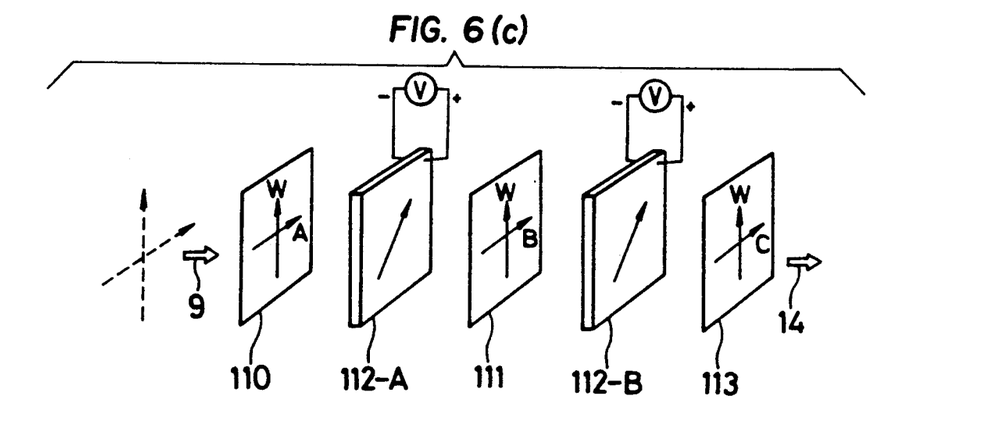

As shown in FIG. 6(b), when a linear polarized light whose polarizing direction is at an angle of 45° with respect to a liquid crystal element is incident upon the control plate 112-A, the polarized surface is rotated through 90° during passing through the liquid crystal layer due to the birefringence (Δn) of the liquid crystal and the thickness of the liquid crystal layer. As shown in FIG. 6(c), when a linear polarized light whose polarizing direction is parallel with the liquid crystal element is incident upon the cell 112-A, the polarized surface of light passes through as it is without being rotated since the polarized light is not affected by the birefringence. Thereby, the light is made to be incident with the liquid crystal element of the variable polarized surface control plate 112-A placed in parallel with the polarized surface of the light, and an electric field is applied to the liquid crystal layer as needed, whereby the polarized surface of light suitably incident upon while adjusting to timing can be varied to 0° and 90°.

Next, a color displaying mechanism will be described. (See FIG. 6(a)) It is arranged so that the direction of a colorless pass-through polarized surface of a first, second and third polarizing plates 110, 111 and 113 comprising a color polarizing plate whose one polarized surface alone exhibits a specific color (wavelength) absorption and the other polarized surface does not exhibit a specific color (wavelength) absorption is made in parallel with and coincidence with the direction of the ferroelectric liquid crystal cell and liquid crystal element long axis of the first and second variable polarized surface control plates 112-A and 112-B. In this state, the incident light 9 of the image light W will be the (W-A) polarized light wherein color A is absorbed in the X direction by the first color polarizing plate 110 and the image light W in the Y direction, which is incident upon the first variable polarized surface control plate 112-A. Since the long axis direction of the liquid crystal element is in coincidence with the polarizing direction, the light is incident upon the second color polarizing plate 11 as it is without being affected by the birefringence, and color B is further absorbed from the polarized light in the X direction to form a (W-A-B) polarized light, and in the Y direction, the (W) polarized light is obtained as it is. Similarly, the light passes through the second variable polarized surface control plate 112-B and the third color polarizing plate 113, and (W-A-B-C) color in the X direction and (W) color in the Y direction are obtained.

When a voltage is applied in a direction in which the long axis direction of a liquid crystal element of the first or second variable polarized surface control plate 112-A or 112-B is at an angle of 45° with respect to the polarized surface of the polarizing plate, the polarized surface is rotated through 90° and the absorbed color of the pass-through light changes. When the states of the first and second variable polarized surface control plates are combined, a combination of absorbed lights is given in Table 1 below.

TABLE 1

| Angle formed between long axis of liquid crystal element of first variable polarized surface control plate and polarizing plate | 0° | | | 45° |
|---|---|---|---|---|
| Angle formed between long axis of liquid crystal element of second variable polarized surface control plate and polarizing plate | 0° | 45 | 0° | 45° |
| Light from X-polarized surface | W-A-B-C | W-A-B | W-B-C | W-B |
| Light from Y-polarized surface | W | W-C | W-A | W-A-C |

It will be understood that if W stands for white, and A, B and C stand for, for example, cyan, yellow and magenta, or red, green and blue, which are suitably combined, then the desired color display may be obtained.

Figure 5A:
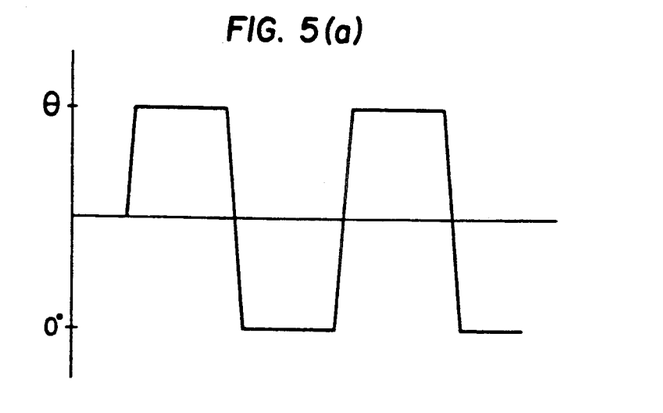
FIGS. 5(a), 5(b), and 5(c) are views showing an example of a drive signal of a variable polarized surface control plate of a color display system according to the present invention.
Figure 5B:
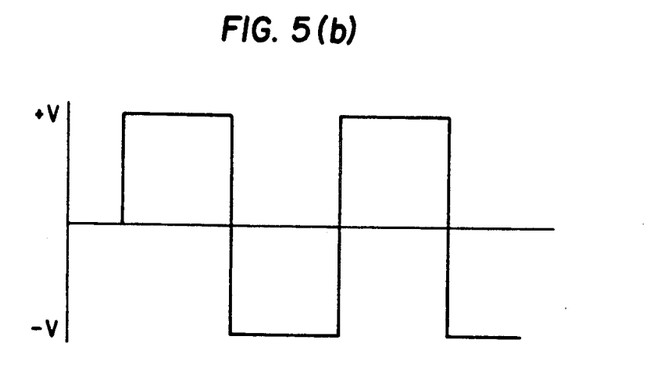
Figure 5C:
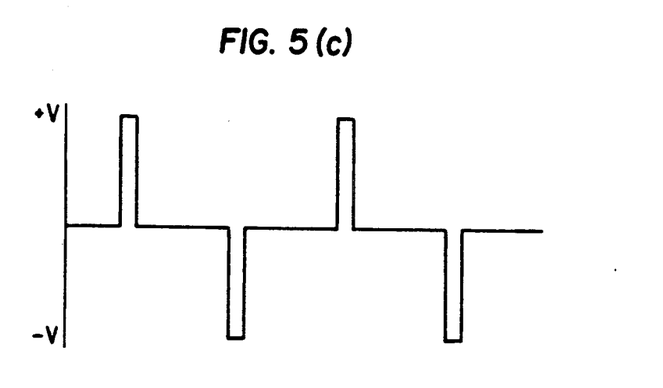

The drive waveforms of the variable polarized surface control plate include the case where a rectangular waveform voltage always in ON and OFF as shown in FIG. 5(b) is applied, and the case where, when the liquid crystal has a memory property, only the pulse for inverting a liquid crystal element as shown in FIG. 5(c) is applied. FIG. 5(a) shows the movement of a liquid crystal element with respect to a drive waveform signal.

The ferroelectric liquid crystal cell which uses the polarized surface control means according to the present invention has one of characteristics in that the cell is capable of responding to ON and OFF in a relatively simple pulse waveform.

The function of a color display apparatus using the variable polarized surface control plate in the form of a ferroelectric liquid crystal will be described by way of embodiments.

EMBODIMENT 1

A cathode-ray tube (CRT) of a non-interlace display in a frame frequency of 120 Hz was used as an image display section, a color polarizing plate SCC2R-12S (red) and SCC2 G-12S (green) (Product Name of K. K. SANRITSU) are joined together at the perpendicularly intersecting polarized surfaces to form a two-tone polarizing plate, and as a variable polarized surface control plate, a liquid crystal cell of a liquid crystal layer 1.4μ with a ferroelectric liquid crystal CS-1014 (Product Name of K. K. CHISSO) sealed therein was used and mounted as shown in FIG. 2. A method of producing the present liquid crystal cell will be described hereinafter.

A glass substrate having the size of 8 inch square, and a thickness of 1.1 mm was optically polished and worked to have a flatness of a plane within 2 μm to obtain a transparent substrate 61. A transparent conductive film (hereinafter referred to as ITO film) formed of 400 Å indium oxide or tin oxide was applied to the transparent substrate 61 by spattering method and form a picture element electrode 62 in accordance with a conventional photoetching method. Further, an insulated film 64 is formed by $SiO_2$ spattering method, on which is spinner coated, as an orientation film, a polyimide resin PIX-1400 (manufactured by HITACHI KASEI KOGYO K. K.) for 2 minutes at 3000 rpm, after which it was heated at 80° C. for 15 minutes, 200° C. for 30 minutes, and 300° C. for 30 minutes. Then, a rubbing device was used to carry out orientation treatment to provide an orientation film 63 to manufacture a first panel A. On the other hand, an ITO film was applied, by spattering method, to the surface of an optically polished glass substrate having a thickness of 1.1 mm and the size of 8 inch square to form an opposite electrode 72 in a manner similar to that as described above, on which is coated and cured, as an orientation film, a PIX-1400 (manufactured by HITACHI KASEI KOGYO K. K.) similarly to the first substrate. A novolak system resist MP-1400-23 (manufactured by SHUPRAY Ltd.) solution was rotatably coated for 15 seconds at 2000 rpm on the second panel B produced as described above, a dot pattern having the size of 50 μm square and a pitch of 150 μm and an external seal portion were exposed and developed in accordance with a conventional photoetching method to provide an adhesive layer 65 and a sealed portion 66. The thickness of a film after developed was 1.5 μm. Next, the first panel A and the second panel B was placed in close contact with each other and pressed under pressure of 1 kg/cm² and heated up to 160° C. at a temperature rising speed of 5° C./min. from a normal temperature and retained for one hour. Then, the resulting material was continuously cooled and the pressure was released to produce a liquid crystal sealed cell. Thereby both the panels were bonded by the adhesive layer 65 and the sealed portion 66. At that time, the cell gap was 1.4 μm over the whole area of the display surface. Thereafter, the sealed portion 66 is sometimes strengthened by other adhesives.

In sealing the liquid crystal, a cs-1014 (manufactured by TISSO K. K.) as a ferro liquid crystal was heated to 120° C. within a heated oven, and said ferro liquid crystal is sealed through a seal opening.

As a neutral color polarizing plate, an LLC2-80-18S (Product Name of K. K. SANRITSU) was used.

Display data on a red image plane is fed from an image display signal section to an image display section to display a picture for red color on CRT, and at the same time, a color filter of a color selection device is made into red by a color selection signal to display red color. Next, a green image signal and a color selection signal are fed to display green, and the image is switched to red, green, red and green every 1/120 second, thereby a color display in the mixed form of red and green, and red and green was observed in a flickerless state.

Figure 9:
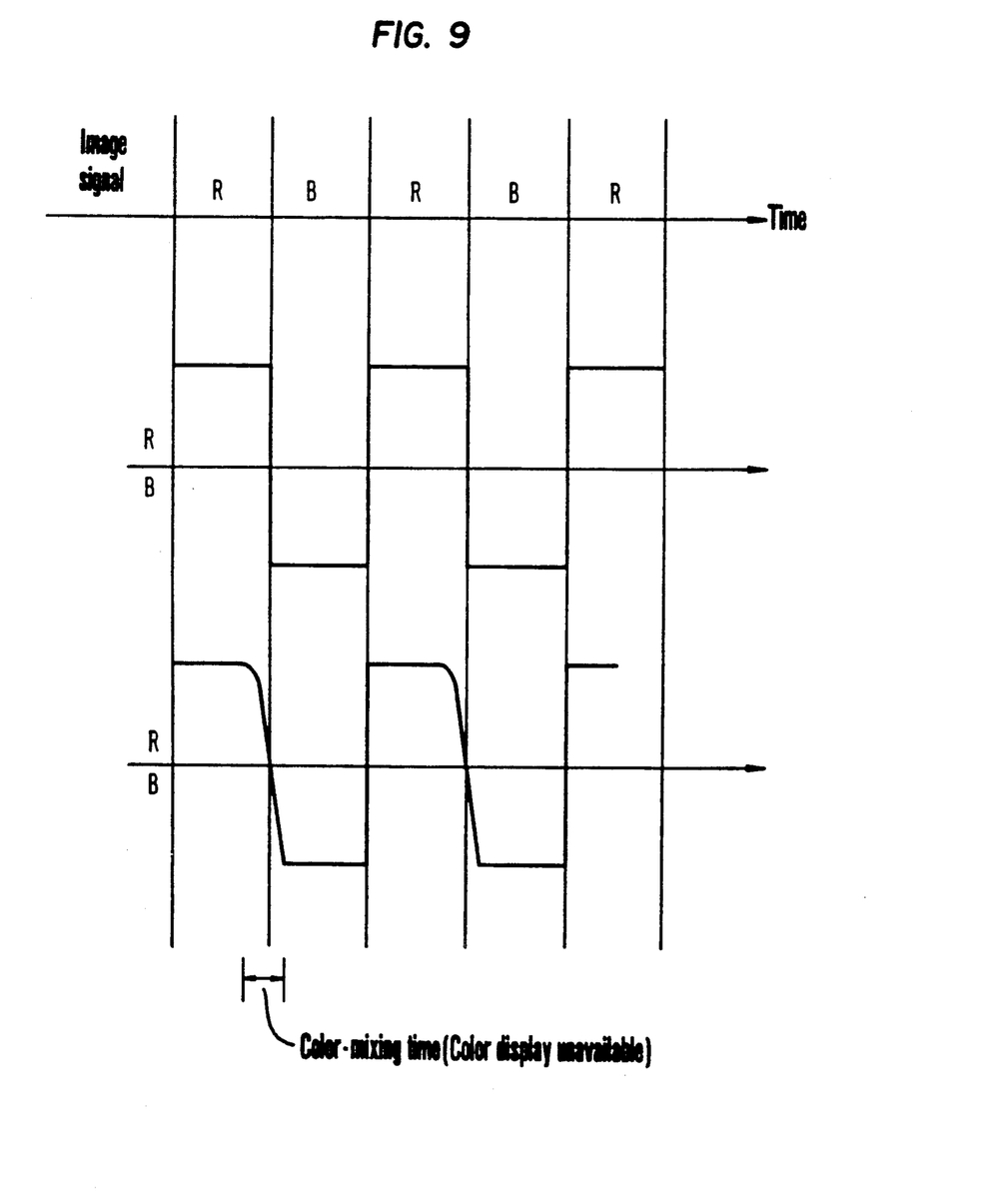
FIG. 9 is a timing chart showing a display timing of a color display system of the present invention.

As shown in FIG. 9, the frame frequency of 120 Hz display one image plane at 8.3 msec. The responsive speed of the color selection device in the present embodiment is 0.18 msec. for both rise and fall, and the real time unsuitable for display in which the color filter is a mixed color being varied is as small as about 2%.

When the color selection device is changed to a TN type liquid crystal cell using a liquid crystal so far described or one using π cell, an average of the responsive speed, rise and fall is 1.1 msec, and the color-mixing time is 13% of the real display time, posing a problem in terms of color contrast, brightness of the image plane and the like.

Conventional products, when they are applied to a three-color display or the like and the frame frequency is enhanced, become unsuitable for practical use because the difference therebetween further increases, whereas the color display apparatus of the present invention renders the high speed response possible to sufficiently withstand a practical use.

EMBODIMENT 2

A cathode-ray tube (CRT) of a non-interlace display white-color light emission in a frame frequency of 180 Hz was used as an image display section, an SCC2B-12S (blue pass-through), an SCC2G-12S (green pass-through) and an SCC2-R-12S (red pass-through) (which are product names of K. K. SANRITSU) were used as a first, a second and a thrid color polarizing plates, respectively, and a liquid crystal cell having a liquid crystal layer of 1.5 μm thickness with a ferroelectric liquid crystal CS-1014 (Product name of CHISSO) was used as a first and a second variable polarized surface control plates. It is arranged so that colorless pass-through polarized surfaces of the first, second and third color polarizing plates are disposed in parallel with and coincidence with the direction of the long axis of the liquid crystal element of the first and second variable polarized surface control plates as shown in FIG. 6. The direction of the long axis of the liquid crystal element of the first and second variable polarized surface control plates are varied to thereby color the CRT image into display colors shown in Table 2 below.

TABLE 2

| | | | | |
|---|---|---|---|---|
| Angle formed between long axis of liquid crystal element of first variable polarized surface control plate and polarized surface of polarizing plate | 0° | | 45° | |
| Angle formed between long axis of liquid crystal element of second variable polarized surface control plate and polarized surface of polarizing plate | 0° | 45° | 0° | 45° |
| Light from X-polarized surface | black | black | black | green |
| Light from Y-polarized surface | white | red | blue | black |
| Combined light of X and Y | white | red | blue | green |

With this arrangement, display data of a red image plane is fed from an image display signal section to an image display section to display an image for red color on the CRT, and at the same time, a color filter of a color selection device is made into red to display red color. Next, a green image signal and a color selection signal are fed to display green. In a similar manner, a blue display is carried out. An image is switched to red, green, blue, red, green and blue every 1/.180 second whereby display of color in the mixed form of red, green and blue, and red, green and blue was observed in a flickerless state.

Figure 10:
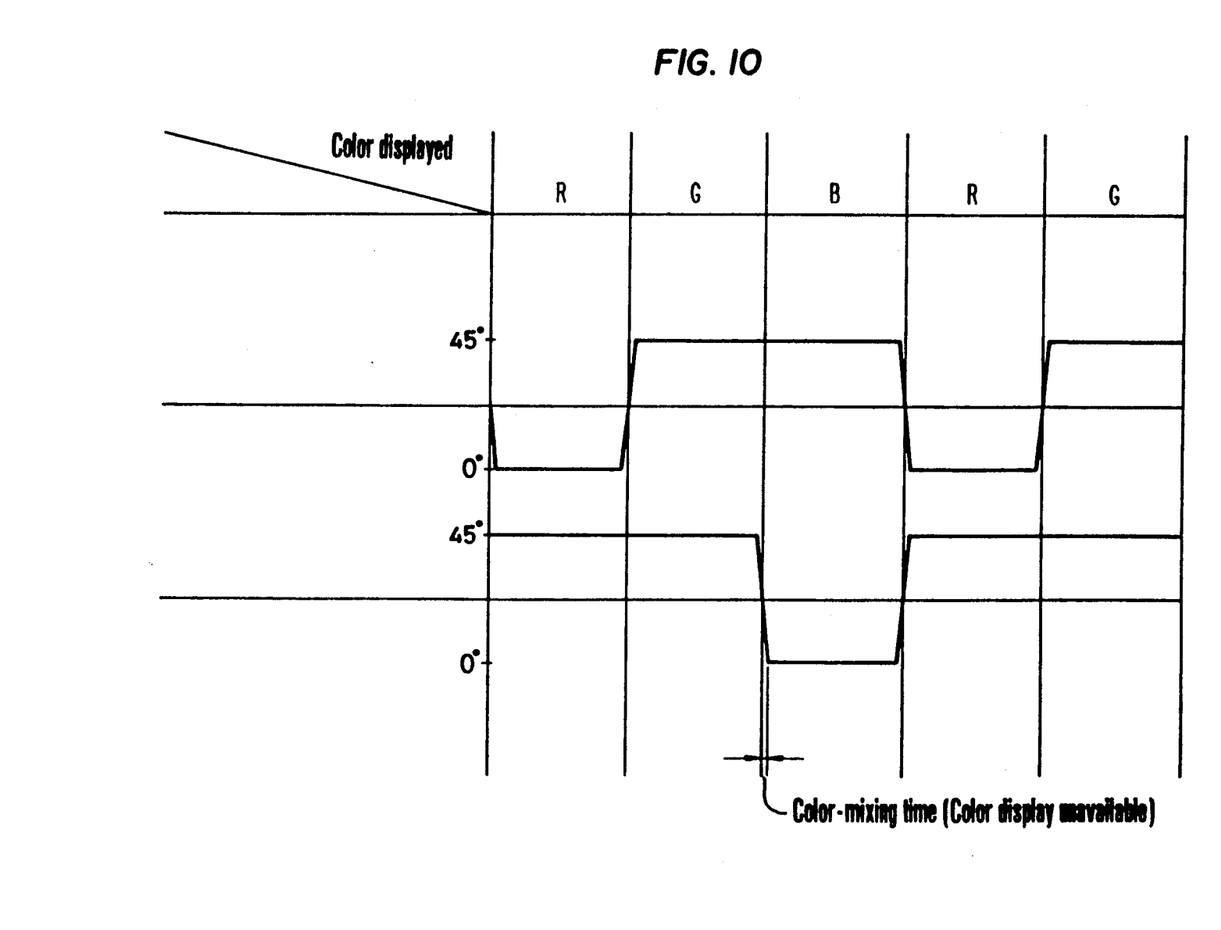
FIG. 10 is an explanatory view showing an example of a drive signal of a variable polarized surface control plate in Embodiment (2) of the present invention.

As shown in FIG. 10, the frame frequency of 180 Hz displays one image plane in 5.6 msec. The responsive speed of the color selection device in the present embodiment is 0.18 msec. for both rise and fall, and the real time unsuitable for display in which the color filter is a mixed color being varied is as small as about 3.2%.

When the color selection device is changed to a TN type liquid crystal cell using a liquid crystal so far described or one using a π cell, an average of the responsive speed, rise and fall is 1.4 msec, and the color-mixing time is 20% of the real display time, posing a problem in terms of color contrast, brightness of the image plane and the like.

Conventional products, when they are applied to a three-color display or the like and the frame frequency is enhanced, become unsuitable for practical use because the difference therebetween further increases, whereas the color display apparatus of the present invention can sufficiently withstand a practical use.

EMBODIMENT 3

Figure 7:
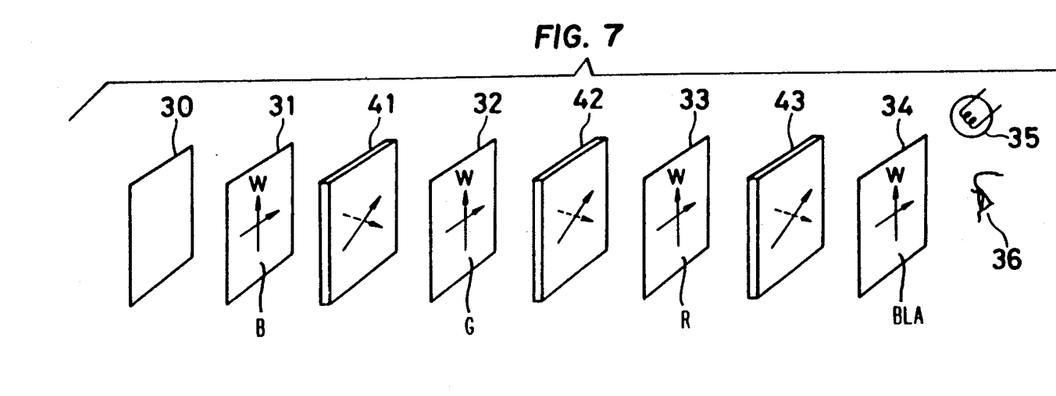
FIG. 7 is an explanatory view showing the structure of another embodiment of the present invention.
Figure 8:
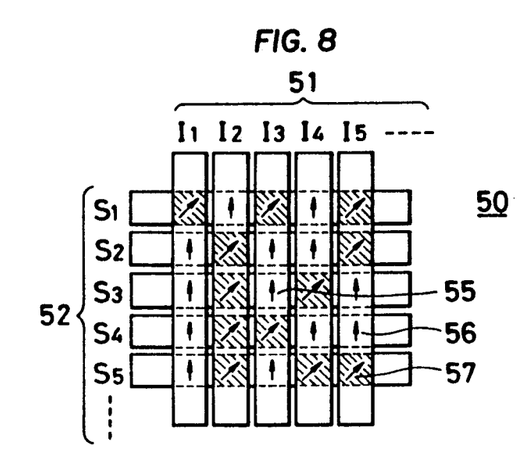
FIG. 8 is an explanatory view showing the electrode shape of an XY matrix liquid crystal cell used in another embodiment of the present invention.

As shown in FIG. 7, in a group of a first, a second, a third and a fourth polarizers, SCC2B-12S (blue pass-through), SCC2G-12S (green pass-through), SCC2R-12S (red pass-through) and LLC2-80-188 (a neutral color polarizing plate) were used as a first polarizing plate 31, a second polarizing plate 32, a third polarizing plate 33 and a fourth poarizing plate 34, respectively, and an X-Y matrix liquid crystal cell 50 of a liquid crystal layer having a thickness of 1.5μ with a ferroelectric liquid crystal CS-1014 (Product name of K.K. CHISSO) sealed therein (which is a cell having a group of scanning electrodes 52 and a group of signal electrodes 51 forming a picture element at a crossing portion as shown in FIG. 8 and having a ferroelectric liquid crystal which is a bistable optical demodulation material with respect to an electric field sealed therebetween. An electric field can be applied to suitable picture elements 56 and 57 of the cell to change the direction of a long axis of a liquid crystal element only in said picture elements 56 and 57 to control the same.) was used as a first, a second and a third variable polarization control plates. As for the image light, a combination of the X-Y matrix liquid crystal cell and a polarized surface invariable reflecting plate 30 under a white color light source serves as an image display section. Arrangement is made so that positions of picture elements in X-Y matrix liquid crystal cells 41, 42 and 43 serving as the first, second and thrid variable polarized surface control plates as viewed from a viewer 36 are registered. It is disposed and oriented so that the long axis direction of the liquid crystal element in the whole liquid crystal cell is made parallel with and coincidence with the colorless light pass-through polarized surface of the first, second, third and fourth polarizers.

The color display in an area corresponding to one picture element as viewed from a viewer and the change in the long axis direction of the liquid crystal element of the first, second and third variable polarized surface control plates are shown in Table 3-(1) and (2).

TABLE 3

(1)

| | | | | |
|---|---|---|---|---|
| Angle formed between long axis direction of liquid crystal element of first variable polarized surface control plate and polarized surface of polarizing plate | 0° | | | |
| Angle formed between long axis direction of liquid crystal element of second variable polarized surface control plate and polarized surface of polarizing plate | 0° | 45° | | |
| Angle formed between long axis direction of liquid crystal element of third variable polarized surface control plate and polarized surface of polarizing plate | 0° | 45° | 0° | 45° |
| Light from X-polarized surface | black | black | black | black |
| Light from Y-polarized surface | white | black | black | red |
| Combined light of X and Y | white | black | black | red |

(2)

| | | | | |
|---|---|---|---|---|
| Angle formed between long axis direction of liquid crystal element of first variable polarized surface control plate and polarized surface of polarizing plate | 45° | | | |
| Angle formed between long axis direction of liquid crystal element of second variable polarized surface control plate and polarized surface of polarizing plate | 0° | 45° | | |
| Angle formed between long axis direction of liquid crystal element of third variable polarized surface control plate and polarized surface of polarizing plate | 0° | 45° | 0° | 45° |
| Light from X-polarized surface | black | black | black | black |
| Light from Y-polarized surface | blue | black | green | black |

TABLE 3-continued

| Combined light of X and Y | blue | black | green | black |
|---|---|---|---|---|

As described above, selective display of red, blue, green, white and black can be made by the picture elements and an image is formed by gathering colors of the picture elements. In the conventional TN type liquid crystal cell using a liquid crystal or the π cell, when the XY matrix drive display is effected, the ability for rotating the polarized surface is greatly lowered. This is because of the fact that a small voltage is continuously applied to the liquid crystal by a crosstalk voltage even at the time of non-selection (OFF), failing to provide a stable color display.

However, the ferroelectric liquid crystal according to the present invention includes a liquid crystal having a bistable memory property, and since a movement of a liquid crystal due to a crosstalk voltage in the memory display state is small, practical color display is effected.

As described above, according to the color display apparatus utilizing a ferroelectric liquid crystal cell which is excellent in optical characteristic and high in uniformity within the plane by the uniformity of a thickness of a liquid crystal cell by the presence of a spacer having an adhesive force and free adjustment of a thickness of a cell of the present invention, a field sequential color display apparatus of high resolution and high speed response, which is simple in construction and can obtain an excellent color contrast and a wide field angle was obtained. Further, since a ferroelectric liquid crystal is used, a simple drive waveform display is obtained, and a variable polarized surface control plate can be X-Y matrix driven. Thereby, the apparatus can be utilized not only for color formation by the field sequential system but for a display by part and by separate color of an image plane. Also, a liquid crystal display device as an image display portion can be used, and therefore, the entire system can be used as a reflective type color display system. This is a color display system having a wide application as described above.

What is claimed is:

1. A color display system comprising at least one means for producing color-polarized light, having a specified wavelength λ, from a light image having a plurality of color components, at least one polarized surface control means which rotates said color-polarized light, a polarizing means for selectively passing light polarized in a selected direction, said polarized surface control means comprising a ferro-electric liquid crystal cell containing a liquid crystal having a refractive index anisotropy of Δn, said cell having a first panel and a second panel, a spacer-adhesive layer and a rigid auxiliary spacer layer interposed between said first panel and said second panel substantially setting a gap d between said panels, wherein $$d = \frac{\lambda}{2 \cdot \Delta n}$$

and wherein said spacer-adhesive layer is photo-etched onto one of said panels in a pre-selected pattern and said rigid auxiliary spacer layer is separate from said spacer-adhesive layer.

2. A color display system according to claim 1, wherein the material for the spacer-adhesive layer is selected from the group consisting of casein, glue, gelatin, novolak resin, rubber, polyvinyl alcohol, vinyl polymer, acrylate resin, polyacrylamid, bisphenol resin, polyimide, polyester, polyurethane, polyamide system resin and photosensitive resins.

3. A color display system according to claim 1, wherein an insulated layer is provided on at least one of said panels.

4. A color display system according to claim 1, wherein the pre-selected pattern of the spacer-adhesive layer comprises dots, lines, stripes or islands uniformly distributed on the surface of one of said panels.

5. A color display system according to claim 1, wherein said polarized surface control means is interposed between two means for producing color-polarized light.

6. A color display system according to claim 1, wherein the polarizing means for selectively passing light polarized in a selected direction comprises a neutral color polarizing plate.

7. A color display system according to claim 1, wherein the polarizing means for selectively passing light polarized in a selected direction comprises a color polarizing plate.

8. A color display system according to claim 1, wherein said rigid auxiliary spacer layer is formed from a material selected from the group consisting of indium or chrome.

* * * * *